(12) United States Patent
Figueroa

(10) Patent No.: US 6,768,656 B2
(45) Date of Patent: Jul. 27, 2004

(54) POWER CONVERTER WITH INPUT-SIDE RESONANCE AND PULSE-POSITION DEMODULATION FEEDBACK CONTROL

(76) Inventor: Salvador Figueroa, 23905 Los Codona Ave. #101, Torrance, CA (US) 90505-5890

( * ) Notice: Subject to any disclaimer, the term of this patent is extended or adjusted under 35 U.S.C. 154(b) by 27 days.

(21) Appl. No.: 10/351,216

(22) Filed: Jan. 25, 2003

(65) Prior Publication Data

US 2003/0151929 A1 Aug. 14, 2003

Related U.S. Application Data

(60) Provisional application No. 60/351,989, filed on Jan. 28, 2002.

(51) Int. Cl.[7] .............................................. H02M 3/335
(52) U.S. Cl. ....................................... 363/21.03; 363/41
(58) Field of Search .......................... 363/41, 16, 21.02, 363/21.03, 131

(56) References Cited

U.S. PATENT DOCUMENTS

| | | | |
|---|---|---|---|
| 4,059,806 A | * 11/1977 | Vagt, Jr. ..................... 329/313 |
| 4,415,959 A | 11/1983 | Vinciarelli | |
| 4,675,797 A | 6/1987 | Vinciarelli | |
| 4,709,316 A | 11/1987 | Ngo et al. | |
| 4,720,668 A | 1/1988 | Lee et al. | |
| 4,785,387 A | 11/1988 | Lee et al. | |
| 4,802,080 A | 1/1989 | Bossi et al. | |
| 4,841,220 A | 6/1989 | Tabisz et al. | |
| 5,073,849 A | 12/1991 | Morris | |
| 5,396,410 A | 3/1995 | Okochi et al. | |
| 6,490,177 B1 | 12/2002 | Figueroa | |

FOREIGN PATENT DOCUMENTS

JP            5-260745        10/1993

* cited by examiner

*Primary Examiner*—Shawn Riley
(74) *Attorney, Agent, or Firm*—Donn K. Harms (57) ABSTRACT

A DC power converter enclosing a regulated AC power supply within the overall design topology. The power transfer function incorporates a process wherein a portion of the negative AC signal, generated across the input winding of a power transformer, is intercepted by a power switch transitional state. The volt-second product of the intercepted AC signal is reflected into the DC input line voltage as an additive element allowing a resonant inductor to absorb the sum of both components. Thus peak voltage transferred to a resonant capacitor is two times the sum of voltage absorbed by the resonant inductor as opposed to simply doubling the DC input line voltage. Voltage across the resonant capacitor remains constant for variations in DC input line voltage within the limits of the input voltage regulating band. This is due to an inverse relationship between the DC input line voltage and voltage yielded by the negative AC signal, at point of interception by the timing pulse. The two components combine in a subtractive manner to cancel out the variation in DC input line voltage and maintain a constant voltage to the input of the AC power supply loop. Input current supplied by the Input DC line also varies inversely proportional to the applied input DC voltage within the regulating band. Thus: negative resistance describing a constant-power load line is derived directly from the peak input current.

12 Claims, 6 Drawing Sheets

FIG. 10

POWER CONVERTER WITH INPUT-SIDE RESONANCE AND PULSE-POSITION DEMODULATION FEEDBACK CONTROL

RELATED APPLICATIONS

This application is based in part on Provisional Application No. 60/351,989 filed on Jan. 28, 2002.

BACKGROUND OF THE INVENTION

1. Field of the Invention

This invention relates to a Current-Sourced, Anti-Resonant, CSAR Technology, DC power conversion process. And more specifically, resonant power converters using a series-resonant input stage comprised in part by power provided by the input DC voltage source in addition to a voltage component extracted from the negative voltage waveform in the anti-resonant tank circuit. And subsequently reflected back into the series-resonant tank circuit, as an additive constituent to the DC source voltage. The two voltage components combine to appear as a source voltage, to the series-resonant input stage, of a magnitude greater than that of the DC source voltage acting by itself. Consequently, the voltage developed across the resonant capacitor, sourcing voltage to the anti-resonant tank, is not confined to the usual doubling of the input DC source voltage. But, rather becomes a product of the combined voltage constituents yielding a resonant capacitor voltage several orders of magnitude higher than the DC source voltage. In addition, increasing the DC source voltage above the initial regulating threshold alters the feedback voltage coefficient in an inverse manner. This characteristic yields a regulated voltage amplitude to the resonant capacitor voltage sourcing energy to the anti-resonant tank circuit. The output winding of the power transformer is also regulated by virtue of its being coupled to a common core. It is this regulating effect by the anti-resonant circuit that introduces a Pulse Position De-modulation coefficient (PPD) into an otherwise traditionally implemented Pulse Position Modulation (PPM) feedback control circuit.

2. Description of Prior Art

It is extremely difficult to differentiate this conceptual development with that deemed "Prior Art" since the technology described herein is a new and a radically different departure from that in general use at this time. By this token, all switching circuits known to date could be relegated into the realm of Prior Art. But to no particular service or advantage to any existing design practice. Thus, the task of describing the Prior Art becomes laborious and unproductive. Delineation lies in the fundamental load-line characteristic reflected by existing switching circuitry and that proposed herein. All switching circuits in current use reflect a negative resistance associated with an input characteristic that is used to describe a constant power input load line. Switching circuitry in current use extracts the negative resistance characteristic from the average current component. The peak current component, in all cases, follows a more traditional conceptual response: It increases with increasing voltage application. Peak current in the circuit function described herein for CSAR Technology implementation differs from traditional switching circuitry in that the negative resistance is derived directly from the peak current. That is to say, The peak current develops in an inverse manner to applied voltage. As the voltage increases: the current decreases in direct proportion. Negative resistance being derived from the peak current—as opposed to its being derived from the average component, as is the usual case, stems from the PPD feedback function. In that duty cycle remains essentially constant with changing input voltage. Therefore: the only circuit function allowed is in a current reaction inverse to that of applied voltage.

It is imperative to point out at this juncture that most of the circuit reactions documented in this application for Letters Patent have been noted in previous circuit structures implemented within the general scope of CSAR technology. The initial being in Provisional application No. 60/103,134 filed on Oct. 5, 1998. The waveform of FIG. 1A, on page 2, clearly shows the power switch timing pulse intercepting the negative portion of the anti-resonant AC voltage at the average juncture.

The circuit described in U.S. Pat. No. 6,490,177 B1 for a design coefficient of K=1.41 will reflect the negative resistance derived from the peak current when the input DC voltage is varied around its nominal 28V level. This characteristic was observed but not fully understood until such time it became obvious that attempts to incorporate this feature in the application would invite an objection of "introduction of new matter" by the Examiner. Another reason for not pushing the matter being that the circuit structure in this Patent is intended for applications fed by regulated PFC mains, or regulated voltages derived from a sourcing power supply. So, in this respect it was deemed to be an irrelevant issue. The aspect of interrupting the negative waveform in the anti-resonant tank is broached in column 8, lines 32 through 36 and column 9 lines 60 through 67 and column 10, lines 1 through 19. Of U.S. Pat. No. 6,490,177 B1. The issues surrounding this phenomenon of being able to discipline circuit design to yield anti-resonant tank voltages much higher than twice the input DC voltage were researched and reserved for this application via provisional application, referenced above, now abandoned.

In conclusion it must be added, that: There is a lot of misinformation being bandied about with respect to implementation of anti-resonance based circuitry. One critique focusing squarely on the problems, inherent to deployment of such topologies, is found in U.S. Pat. No. 4,415,959 by P. Vinciarelli. Under section 2, titled: "Description of the Prior Art." Mr. Vinciarelli projects a clear understanding of problems associated with deployment of such circuit topologies. His dissertation pin-points the principal problems associated with this technology in the early years of such developments. Observations tendered in this document fortunately are no longer valid, with the development of the anti-resonant topology based on CSAR Technology. Others have used these concerns, however valid, as scare tactics simply to promote inferior, peripheral circuit topologies with little or nothing to offer with respect to real progress. There are, to be sure, valid concerns regarding over-all discipline of CSAR Technology as there is with any new proposal. One consideration being in the circulation of higher than usual current in the loop formed by the resonant capacitor and the primary winding on the power transformer. While this is something to be given due consideration in circuit design: The importance of such is in fact minimal. Low output hardware—of 1.0V, or less,—provides designers with many favorable design options to address this problem. A power converter of 1.0V—30A is a 30W unit. One auspicious physical observation is that heat radiating surface increases as power is decreased. Therefore accommodation of the thermal contribution from such circulating current becomes merely a minor design consideration. And easily off-set by the consideration that no extra circuitry is required to re-set the core's magnetic field as well in addition to the advantage, cited above, for the inherently increased heat radiating surface area. The examples above, are included to acknowledge that while design problems exist in successful deployment of CSAR based Technology, They are well within the limitations of prudent engineering practice within the design disciplines available in present day practice.

SUMMARY OF THE INVENTION

An object of this invention is to describe a design process incorporating functional properties embedded in CSAR Technology under a Pulse-Position-Demodulation feedback control loop.

Another object of this invention is to describe a power transfer function based on non-polarized, half-wave rectified, fly-back simulation under CSAR Technology PPD control.

Another object of this invention is to describe a power transfer function based on non-polarized, half-wave rectified, with wave-shaping output filter under CSAR Technology PPD control.

Another object on this invention is to describe a power transfer function based on a center-tapped, full wave rectified, L-C integrating output filter under CSAR Technology PPD control.

Another object of this invention is to illustrate capability by the power transfer function to accept any combination of half, or full-wave, rectifier/filter assemblies on the secondary windings of an isolation transformer. For delivery of power to prescribed output loads.

Another object of the invention is to illustrate a bi-polar power transmission process allowing non-polarized magnetic transformation with automatic re-set of the flux field in the magnetic core while using a single power switch referenced to the input power return bus.

Another object of the invention is to define a design discipline in which an over-all DC to DC power conversion process incorporates a regulated AC to DC power supply loop within the over-all design topology. Wherein power supply AC input current is sinusoidal and continuous throughout the power transmission cycle while in complete isolation from the power switch.

Another object of the invention is to reflect high circuit adaptability to synchronous rectification due to soft cross-over of secondary AC currents circulated in the transformer and rectifier/filter assemblies.

The transfer functions described herein subscribe to standard industry definitions for functions employed. The definition for Anti-Resonance abides by the numerical definition described in "Principles of Radio Engineering" by R. S. Glasgow, and are as defined grammatically in "Webster's Encyclopedic Unabridged Dictionary of the English Language" 1989. Power transfer terminology such as; half or full-wave relates to the type rectification circuit employed to transfer a power pulse from the input mains to the output load only, as defined by "Rectification circuits" by R. W. Armstrong, Proc. I.R.E. Vol. 19, January 1931. In the same context: A power converter converts power from a DC source to a DC load. A power supply transfers power from an AC source to a DC load and an Inverter converts power from a DC source to an AC output.

A practical circuit for achieving power transfer from a DC input power source to a DC load, while incorporating an AC power supply within the power transfer loop, consists of a DC voltage source, a resonating inductor and a resonating capacitor to describe an input current source. Placement of a magnetic transformer winding across the resonant capacitor will result in a parallel-resonant circuit if the transformer winding inductance is made to resonate with the capacitor. In this case, the reactance of each resonating element will cancel each other out yielding, an internal impedance equal to unity. Consequently, current flowing in the parallel tank circuit will develop a voltage of infinite proportion leading to circuit destruction. Thus, the term: Anti-resonance. In a practical circuit however, this condition is not allowed to exist due to load current reflection from the output winding to the input winding by virtue of both being located on a common magnetic core. The load component is out-of-phase with the reactive element by 90 degrees thus serves to swamp-out the reactive components which have essentially canceled each other out. Load current thus flows in the transformer input winding throughout the entire frequency cycle, by virtue of its 90 degree phase-shift, thus preventing the circuit to become anti-resonant, although it is configured as such. Anti-resonant circuitry does not require a high degree of loading for functional stability due to the high quality of available materials. Test circuits have been operated at no-load with out damage. Circuitry designed for operation at no-load would require special control configurations for prolonged operation at no-load, either a bang-bang control loop or a power to energy conversion feedback control scheme to over-ride the PPD control loop at a specific light load condition.

When the resonating capacitor is sized correctly to accept the required amount of energy to satisfy the transfer requirement. That portion of the negative waveform created across the transformer input winding, and intercepted by the timing pulse ON transition, will transfer its volt-second envelope in an additive manner to the DC input line voltage to be absorbed by the resonating inductor as a composite of the two voltages. The resonating inductor then transfers two times the voltage absorbed to the resonating capacitor. For instance; if a 20V DC input source is coupled to a 10 volt-second segment of the negative sine wave impressed across the primary winding of the power isolation transformer by the intercept action of the power switch: A voltage of 30 volts will be absorbed by the resonating inductor. The resonating inductor will then release an equal amount of voltage as a negative polarity across the resonating capacitor as that absorbed from the source. Thus two times the voltage will be deposited across the resonating capacitor for a peak voltage of: 60V! Thereby a 20V DC input line will generate a 60V peak pulse across the resonating capacitor—and maintain that level as a regulated voltage for increasing input line voltage above the lower regulating band threshold. This is due to positive migration of the intercept point along the negative cosine voltage slope in an inverse relationship between the two voltages. A circuit with design parameters specified herein will regulate and input line swing of 2:1. Breadboard circuitry used for reduction to practice of the theoretical concepts embodied herein regulated a DC input line voltage swing from 20 to 40V. Experimental circuits have yielded regulated DC input line voltage swings of 3:1.

A properly designed circuit will exhibit a sharp transition into the regulating band. If, for instance, the lower regulating band limit is set to 17V for a desired regulating band of 20–40V, the input line will be well into regulation by the 20V lower limit due to the sharp band transition. Experimental circuitry reveals a certain amount of headroom is required above the upper limit of the input voltage regulation band to accommodate load regulation. Load regulation involves voltage amplitude as opposed to duty cycle control being that Pulse Position De-modulation (PPD) negates, to a certain degree, variable duty cycle for load changes as well as line swings. And finally, PPD control works best with a low design co-efficient (K) due to need for a substantial negative voltage swing in the Anti-Resonant voltage waveform. There is a design need for introduction of a limited amount of duty-cycle control into the feedback loop to prevent re-flow of current from the input DC voltage source. This condition is introduced during the time that instantaneous AC sinusoidal voltage on the positive portion of the cycle becomes lower than the DC input line voltage level. A condition designated as Voltage threshold, Vth, and deemed a prohibitive operational state. It introduces a situation allowing flow of input current from the input DC voltage source into the anti-resonant circuit due to the power switch being in an ON state beyond this point in time, resulting in the power switch having to interrupt input current and diminished over-all circuit performance. The power switch tends to remain ON beyond the point of crossover voltage level between that of the input DC voltage source and Vth because the timing pulse has a built-in finite time duration. Therefore; allowing the timing pulse leading edge to migrate along the negative cosine slope of the AC power waveform, also results in the trailing edge on the timing pulse to move in a similar manner. And although, initially set to be above Vth, it very quickly migrates below Vth, to allow re-flow of input line current into the anti-resonant tank circuit.

A viable correction for this functional anomaly being the introduction of a frequency differential between that designed for the input series-resonant charging circuit and the forced-oscillating frequency, Fo, component incorporated in the carrier-frequency assigned to the anti-resonant tank circuit. This situation introduces a dead-band between the two frequency components and also brings into play a certain degree of duty cycle variation into the feedback loop which is used to compensate for migration of the trailing edge of the timing pulse. This design process serves to maintain the timing pulse trailing edge above the critical, Vth, level of the anti-resonant tank circuit voltage during its positive transition, and stabilize circuit function throughout specified input voltage and load variations.

DESCRIPTION OF THE INVENTION

Figure 7:
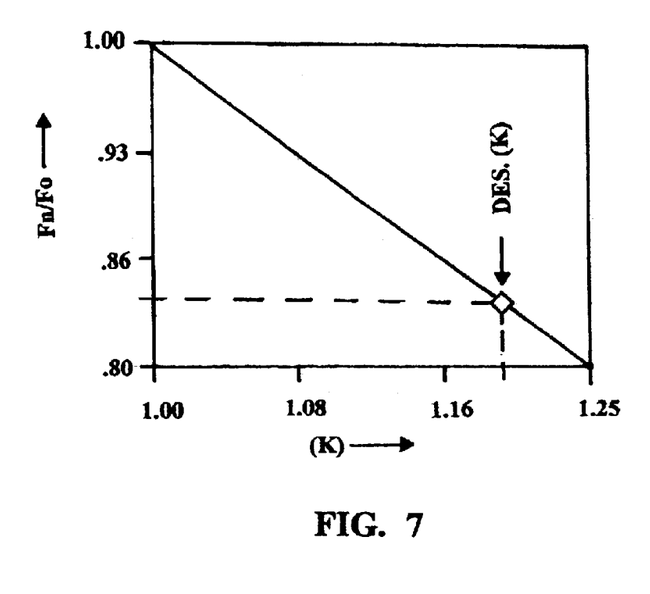
FIG. 7 plots the design coefficient (K) vs. Fn/Fo used in determining the natural resonant frequency in CSAR Technology power converters.
Figure 7A:
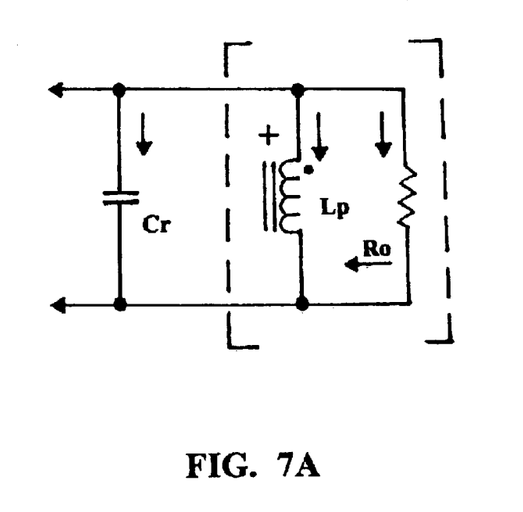
FIG. 7A represents an equivalent electrical schematic depicting image parameters reflected into the anti-resonant tank circuit during time of forced oscillation, Fo, frequency component of the composite carrier-frequency.
Figure 7B:
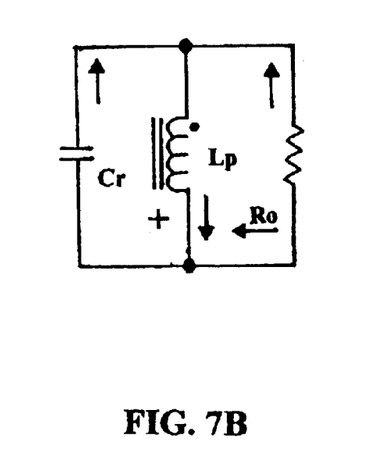
FIG. 7B Illustrates the equivalent circuit generated within the anti-resonant tank circuit during time of natural oscillation, Fn, frequency component of the composite carrier frequency.

An overview of the power transfer process is provided by FIGS. 7, 7A and 7B. FIG. 7 plots the slope of Fn/Fo vs. design coefficient K. Where design coefficient K is a multiplier applied to the frequency of natural resonance, Fn, to derive an inverse function resulting in slope Fn/Fo.

FIG. 7A describes image impedance reflected from the load through a power isolation transformer to a resonant capacitor during time period of forced oscillation Fo. This impedance is defined as:

$$Zp = \omega L R/(\omega^2 L^2 + R^2)^{1/2} \quad \text{(eq. 1)}$$

Impedance Zp acts upon resonant capacitor Cr in a manner to create a time-constant describing the discharge rate for capacitor Cr during the time forced oscillation frequency component, Fo. Where power switch 10 has opened and transformer 14 output voltage Vs is higher than Vo by the forward voltage drop of the rectifying element(s) 15/16. The discharge time constant then becomes:

$$Td = ZpCr \quad \text{(eq. 2)}$$

Component Fo encloses a non-resonant, forced oscillation, frequency equal to:

$$Fo = 1/(2\pi Td) \quad \text{(eq. 3)}$$

FIG. 7B describes anti-resonant tank parameters during time of resonant frequency component Fn. Tank parameters are illustrated as follows:

Fn is equal to: Fo/K. Therefore, transformer open-circuit inductance becomes:

$$Lp = [(1/2\pi)/Fn]^2/Cr \quad \text{(eq. 4)}$$

And anti-resonant tank internal impedance during time of frequency component Fn becomes:

$$Zp = R/[1 + R^2(\omega Cr - 1/\omega Lp)]^{1/2} \quad \text{(eq. 5)}$$

The resultant impedance, Zp, for the parallel-tuned combination of Lp/Cr in an unloaded condition during time period for frequency component, Fn, is equal to unity. This condition describes a state of anti-resonance, in which:

$$Zr=[\omega^2 LpCr]=1 \qquad \text{(eq. 6)}$$

The equation above describes a classical definition for a state of oscillatory anti-resonance with no internal resistance of any consequence acting upon the reactive components. In a practical circuit, such as that described herein, operation within the realm of anti-resonance is precluded by introduction of the load component to act upon the inordinately high reactance internal to the parallel-resonant circuit formed by enclosure of reactive components operating 180° out-of-phase. The result of the transformer's open-circuit inductance being shunted by the reflected load resistance is that a quadrature component, 90° out-of-phase with the AC voltage source, is impressed across the primary winding of the power transformer. This condition allows load current to flow in the AC voltage developed across the transformer primary winding throughout the composite carrier-frequency cycle. And serves to stabilize the anti-resonant circuit by the relatively low value of reflected resistance shunting the inordinately high reactive constituents. The net effect of the transformer's inductance, Lp, working in concert with the resonant capacitor, Cr, being that an AC voltage source is generated across the transformer input winding. Current flow in the primary winding displaced from the voltage by 90°, introduced by the load component insures operational stability in the LCR network throughout the entire carrier-frequency cycle.

The AC voltage source introduces a regulated AC power supply characteristic to the power transfer function allowing power transmission embodied as either half or full-wave configuration. A practical design approach entails the following considerations:

Input V-A envelope. Parametric boundaries for the input V-A envelope includes combining the results of eq. 1 with input power required and adding them vectorially. A good approximation has been found to be 2.25 times power out (Po). Calculation for resonating capacitor then becomes:

Power $(P)=2.25\ Po.$ (eq. 7)

Energy=$(P)[(1/Fo)/2]$ (eq. 8)

Capacity=$2E/V^2$ (Note: V=average voltage across capacitor) (eq. 9)

Once the capacitor sizing has been established, the remainder of parametric calculations is straightforward. Equations 7 to 9, above apply specifically to the circuit configuration of FIG. 2. Circuit requirements for FIGS. 3 and 4, differ slightly in that power current component in the transformer input winding is transferred to the load only on a half-cycle basis whereas in the circuit of FIG. 2, the power current component is transferred to the load on a full-wave basis. This observation tends to re-enforce the observation that power efficiency for the full-wave circuit is greater than for either of the half-wave configurations. Thus the calculation for resonating capacitance differs slightly for the half-wave basis from that of the full-wave basis. There is also a slight difference between power calculation for the half-wave, simulated fly-back circuit as opposed to that for the half-wave, with a wave-shaping filter. The principal difference is in the peak current required by each circuit configuration. Thus RMS current differs and with that so does the volt-amp requirement. The difference in each case is rather small. So equations 7–9 offer a good first approximation for either of the half-wave circuit configurations. All other equations are standard for either power conversion topologies or power supply considerations. The only other consideration is that a peak transformer output voltage of 2.7 times the output DC voltage is required for the half-wave, with wave-shaping inductor, and a secondary winding current of 3.14 Io DC. As for the simulated fly-back circuit the transformer output voltage is 9.0V peak, with a secondary winding current of 5.7 A pk.

Figure 3:
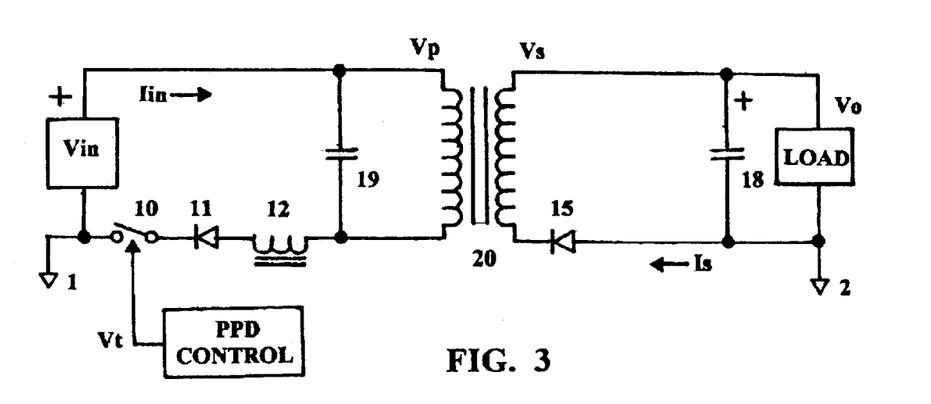
FIG. 3 depicts a power transfer schematic deployed as a non-polarized half-wave rectifier simulating a fly-back power converter.
Figure 4:
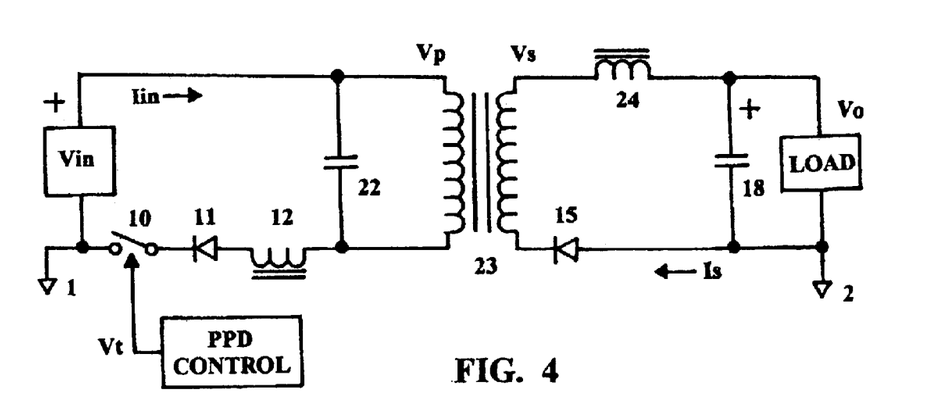
FIG. 4 illustrates a power transfer schematic deployed as a non-polarized half-wave rectifier with a wave shaping filter inserted into the output filtering assembly.

As noted above, the circuit in FIG. 2, is the preferred embodiment by virtue of its being the most power efficient due to both positive and negative current elements circulated in the primary winding of the power isolation transformer are applied to he load. Circuitry in FIGS. 3 and 4 are included herein because they represent non-polarized transfer functions integrated in FIG. 2. And as such become component parts of FIG. 2.

Figure 1:
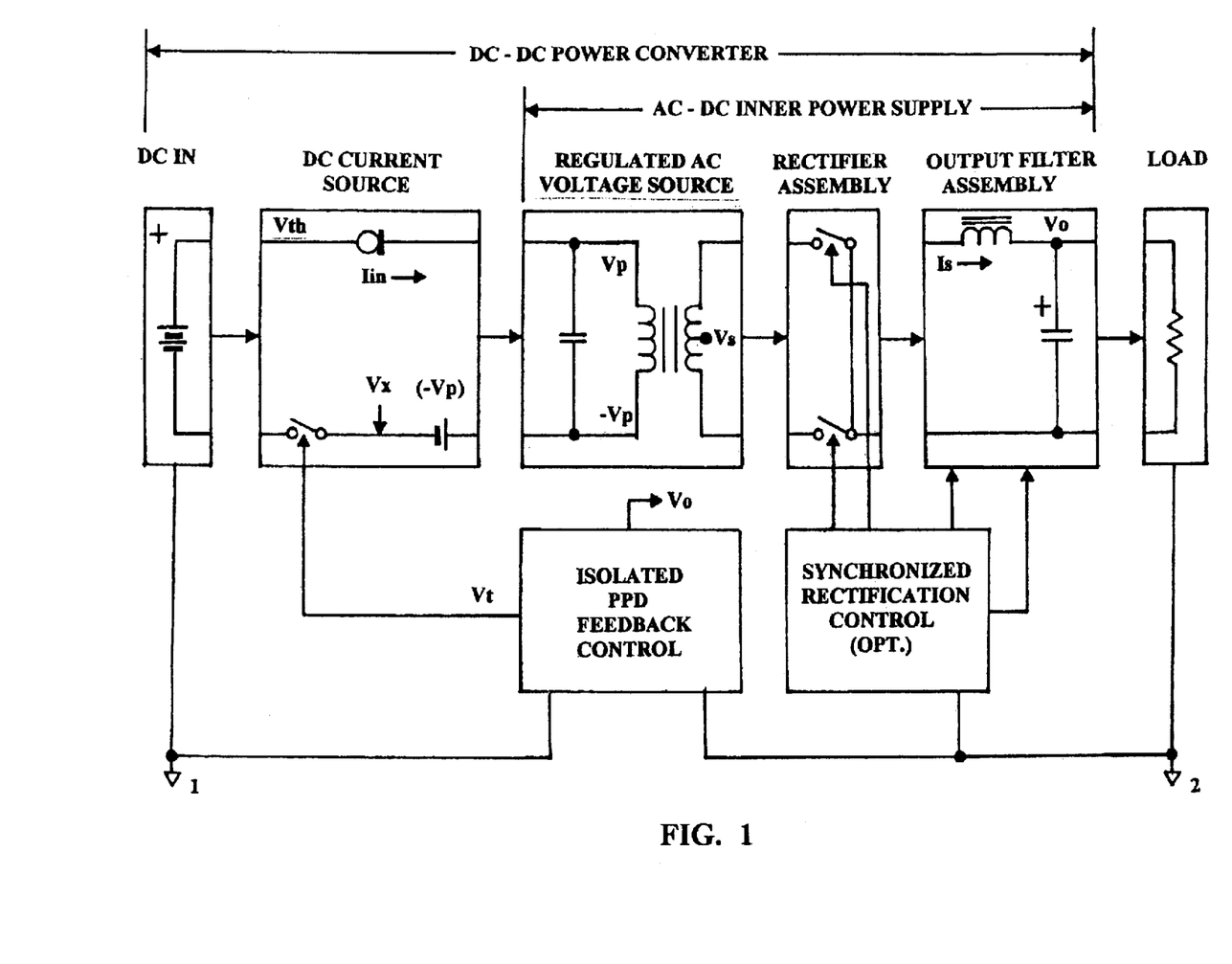
FIG. 1 is a signal/power flow block diagram illustrating energy flow for the DC to DC transfer function from the Input DC voltage source to the output load. It also depicts one possible manner of inter-connecting the control functions to the power train.
Figure 10:
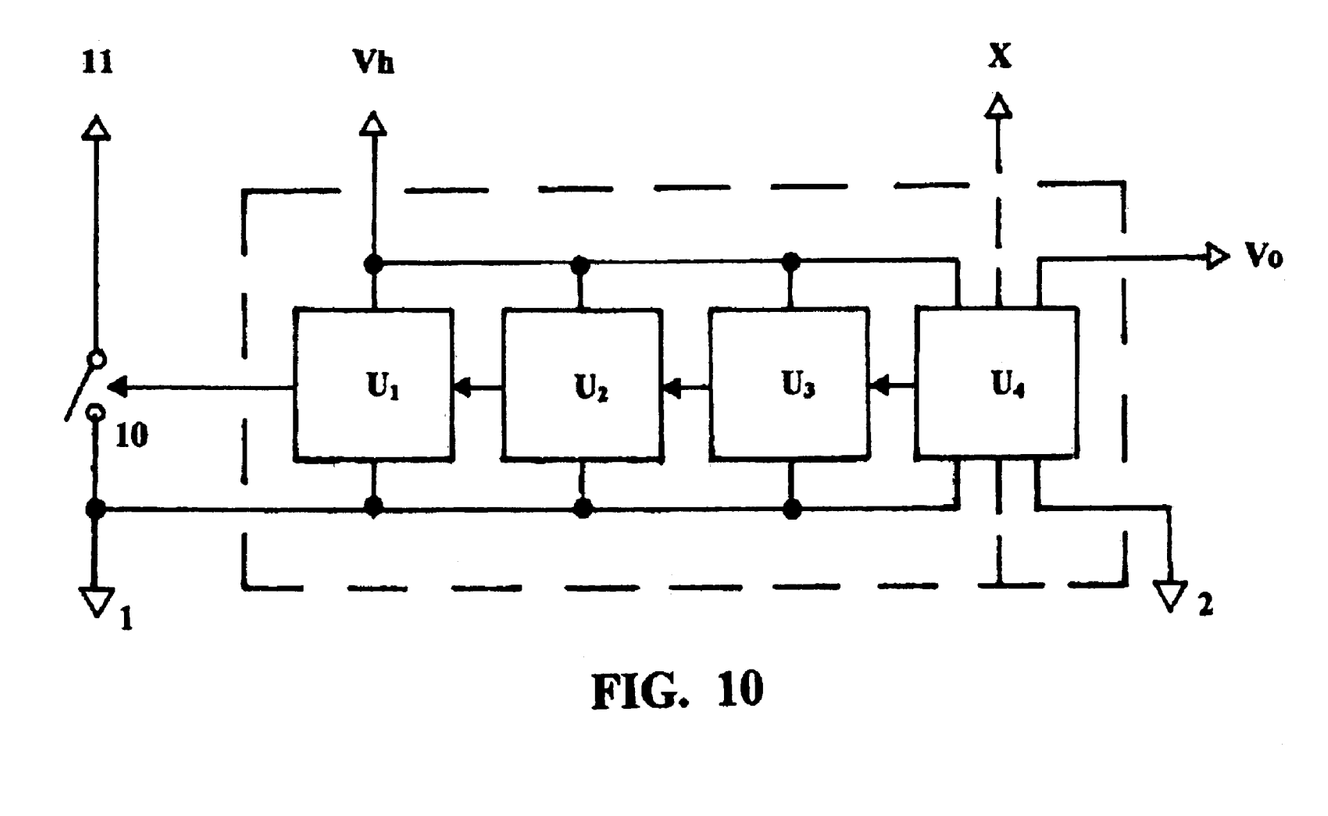
FIG. 10 describes a functional diagram for the Pulse-Position-Demodulation (PPD) feedback control loop including the DC isolation stage denoted by dashed line X.

FIGS. 1 and 10 are stand-alone descriptions of over-all power and/or control signal flow. Since their general description applies to all circuit configurations described herein, they are described as separate items prior to the detailed description of specific circuits with associated plots and graphs.

Block diagram of FIG. 1: Defines flow of energy for the entire process of accepting a quantum charge from an input DC voltage source, processing of the energy envelope, and ultimately depositing said energy packet across an output filter capacitor for delivery to an appropriate DC load. The series consisting of:

INPUT DC SOURCE: (DC IN) Denotes a primary DC power source, whether in the form of a battery, isolated DC power supply or rectified and filtered AC mains;

DC CURRENT SOURCE: Consists of a resonating inductor switched between the DC voltage source, a resonating capacitor and intercepting a portion of the negative voltage swing Vx developed across the primary winding of an isolating power transformer by a power switching device inserted in the input power return line. Voltage absorbed by the resonating inductor equals the DC input line voltage plus the volt-second product of the intercepted portion of the negative voltage (–Vp) across the primary winding of the isolating power transformer. This volt-second product is transferred to the resonating capacitor as a product twice the volt-second envelope absorbed by the resonating inductor, charging the resonating capacitor to twice the peak voltage absorbed by the resonating inductor. The voltage developing across the resonating capacitor is three times the DC input line voltage and remains fixed at that level throughout and input DC line voltage of 20 to 40V. Thus creating a regulated voltage source to the internal AC power supply embedded in the over-all DC-DC power transfer function. Current in the DC Current Source describes a half-sine pulse whose peak amplitude is inversely proportional to the DC input line voltage within the regulating band. Therefore: input current is twice the amplitude at low line input than it is at high line input within limits of the regulating band.

REGULATED AC VOLTAGE SOURCE: Consists of an AC power isolation transformer describing a regulated voltage source embedded within the over-all DC-DC power transfer function. The transformer's function is as follows: With the resonating capacitor fully sized to provide the necessary volt-amps required at the specified input voltage, circuit turn-on will allow the resonating capacitor to charge to its designed voltage level of 60V peak and higher by some pre-determined amount. At the pre-designated level, transformer turns ratio will develop the required voltage at the output terminals whereby the PPD control loop will lock in to some prescribed level of intercept on the negative portion of the sine wave driving the primary winding of the isolation power transformer. The control loop will intercept just the required negative volt-second product to hold the peak sine wave voltage at exactly 60V peak, thereby regulating power transfer from the resonating capacitor to the output terminals. If the DC input voltage rises within the limits of the regulating band, the control loop will vary the point of intercept to hold the peak sine wave voltage at the required 60V peak. The PPD control loop is provided with a frequency band, a ratio of frequency between the half-sine input current pulse and the Fo portion of the carrier-frequency impressed across the anti-resonant tank circuit. This frequency ratio, injected into the loop in the time domain, allows input DC line voltage excursion within the prescribed voltage regulation limits. A design procedure intended to prevent the timing pulse turn-off command from migrating below the Voltage threshold, Vth, at which point; input current from the DC source would again flow through the anti-resonant circuit due to the input power switch being in an ON state. Thus a certain amount of duty cycle control is injected into the control circuit to allow migration of the intercept point within prescribed limits without allowing input current to flow under undesirable conditions. An alternate method for maintaining the timing pulse turn-off above the Vth limit is to make the time base for both the current source input current, Iin and the ting pulse ON time the same. Such that both operate at a frequency about 33% higher than the Fo portion of the carrier-frequency impressed in the anti-resonant tank circuit. In this instance, the timing pulse ON time is the same frequency as that for current source input current, Iin. The timing pulse will then be able to migrate from its initial set point at low input line limit, to at or about Vth at the high input line limit. The recommended 33% increase in frequency for the half-sine input current pulse and the timing pulse ON time applies to an input line regulating band of 2:1 only. Higher input line regulation bands require a higher frequency ratio to be applied to those particular parameters.

RECTIFIER ASSEMBLY: The assembly shown is that for a center-tapped transformer output winding, terminated into a full wave, rectifier configuration and terminated into a smoothing filter as that shown in FIG. 2. Actual rectification may employ either static or active commutation. While circuit symbols used in FIGS. 2, 3, 4, and 5 are for minority-carrier, p-n junction devices, reference designations are only symbolic. In actual practice, passive rectification would include Schottky barrier diodes, and power FET's or IGBT's would be used for active commutation in the form of synchronous rectification. Actual rectifier implementation may be half-wave, full-wave or any mix thereof for multiple output applications.

OUTPUT FILTER ASSEMBLY: The configuration shown is for the full-wave, center-tapped, smoothing filter implementation of FIG. 2. The output filter may be deleted altogether for deployment as a non-polarized, half-wave, simulated fly-back power transfer function as illustrated in FIG. 3. The output filter may also be configured as a wave-shaping inductor for a half-wave, non-polarized power transfer configuration as depicted in FIG. 4.

OUTPUT LOAD: Indicates user load designated to accept power from the DC-DC power conversion process.

ISOLATED PPD FEEDBACK CONTROL: The feedback control loop senses voltage level at the output terminals and upon sensing a pre-set level generates a signal routed back to the power switch in such a manner as to preserve the specified voltage level at the output terminals. Customarily this is a negative feedback signal but it is not necessarily so, in all applicable conditions. The object of the control circuit is simply to maintain a constant output DC voltage within pre-set conditions.

SYNCHRONOUS RECTIFICATION CONTROL: Control for active rectification, when employed would sense the appropriate time to close or open the active switching devices. One simplified method is to sense the voltage across the smoothing filter inductor and when the input voltage to the inductor crosses the threshold of the output DC voltage level, activate the proper switch consistent with phasing requirements to allow current conduction. The sequence from then on becomes one of alternately switching rectification switches on a 50% duty cycle as applicable to the full-wave rectification circuit of FIG. 2, or switch a single rectification switch in an alternate manner during time of required conduction as applicable to FIGS. 3 and 4.

BLOCK DIAGRAM OF FIG. 10: Defines signal flow in the PPD control loop. From the point of sensing output DC voltage to the task of directing an ON-OFF control signal to the input power switch. The principal task of the control loop is to define error signal flow, process it for appropriate gain, phase and voltage level. The resulting error signal is then routed to the gating terminal of power switch 10 properly de-modulated for re-instating the output voltage to its pre-set level. Vh is the power input to drive the circuitry internal to this block diagram.

U4: is dedicated to sensing the output DC voltage directly at the output terminals, or remotely at some point in the user load. Error signal is detected and de-coupled in U4 by an optical isolator to separate the output return from the input return and thus preserve DC isolation between the input and output terminals. Dashed line denotes DC isolation introduced by the opto-isolator. DC isolation may be injected elsewhere in the control circuit, and may be magnetically isolated with similar results.

U3: consists of an op-amp employed to process the error signal for phase/gain considerations and develop an output signal consistent with re-stating pre-set voltage conditions at the output terminations. The op-amp normally is used to process error signals in a negative configuration, but not necessarily so. The object is for the total error signal to be processed in a negative manner, whether directly at the op-amp or in some other part of the control circuit. Thus, phasing of the error signal may take place anywhere within the control loop.

U2: is an integrated-circuit timer. Control signal de-modulation takes place within this integrated block. The signal that would normally be processed in a Pulse-Position-Modulated mode is de-modulated in a manner consistent with over-all loop response. This comes about mainly by integration the PPM control function with migration of the power switch, turn-ON pulse, leading edge along the cosine slope of the negative portion in the AC voltage signal generated within the anti-resonant tank circuit. Combining of the two feed back signal properties results in defining the resultant PPD control function.

U1: is an integrated-circuit high current driver. Its operational state being controlled by the signal transmitted from the I-C timer, U2, processed within prevailing internal thresholds then the output drive signal is routed to the gate terminal of power switch 10 for ON/OFF control of power switch 10.

Figure 2:
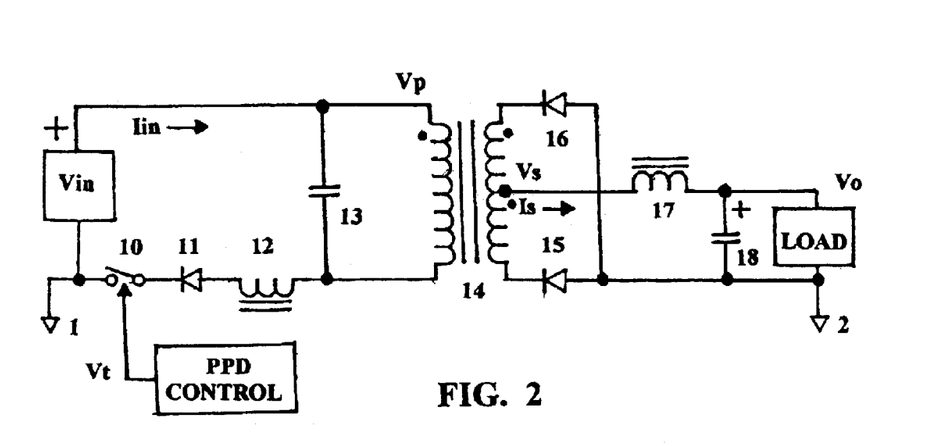
FIG. 2 Is a circuit schematic for a full wave, center-tapped configuration terminated by an L-C integrating filter. Circuit depiction illustrates preferred embodiment for the power transfer function described herein. Circuit configuration incorporates both polarity combinations suggested in FIG. 4, by virtue of non-polarized windings, for a single-ended, half-wave rectifier, with a wave-shaping inductor in the L-C output filter.

FIG. 2: Circuit configuration of FIG. 2 depicts the preferred embodiment for the power transfer function described herein. This circuit schematic embodies a full-wave, center-tapped, rectifier/smoothing filter configuration. Power flow in FIG. 2 initiates with closure of power switch 10 impressing The DC input voltage source on resonant inductor 12. Resonant inductor 12 absorbs the DC input voltage level to develop a peak flux field of a positive polarity. The flux field developed in the magnetic core of resonant inductor 12 undergoes a reversal in polarity at this point in time, releasing energy stored in the flux field until the flux field is returned to a 0 (zero) state. Current through the winding of resonant inductor 12 builds-up from 0 (zero) at initiation of switch 10 closure progressing to a peak, half-sine, level at the point of polarity reversal in the flux field of resonant inductor 12. Then decays to 0 (zero) amperes when the flux field returns to its quiescent state. The resulting half-sine current pulse is deposited in resonant capacitor 13 charging it to a voltage level twice that of the input DC line voltage. In the meantime some current flows into the primary winding of the power isolation transformer 14 to initiate energy transfer into the anti-resonant tank circuit, converting the half-sine current pulse into a full AC sine wave Vp in the anti-resonant tank circuit. Timing pulse signal turns OFF prior to the positive cycle of the sine wave across the power isolation transformer 14 decays to level below that of the input DC voltage source, which if remained ON would allow source current to once again flow through resonant inductor 12. Occurrence of which would result in adverse affects upon the power switch and energy transfer characteristics of the input power management segment of the power converter.

The tiring pulse remains OFF during a portion of the positive cycle and the negative transition of the AC power signal within the anti-resonant tank circuit. Timing signal turn ON occurs well within the negative excursion of the AC power signal as the signal progresses toward the AC 0 (zero) voltage reference. The timing signal then intercepts the negative cosine slope of the AC signal, intercepting a discrete volt-second product of the negative cycle from the AC power signal. The volt-second product intercepted by the timing signal appears in series with resonant inductor 12, allowing resonant inductor 12 to absorb this volt-second product in addition to that received from the DC voltage input line. The total energy charge absorbed by the resonant inductor 12 then transfers to the resonant capacitor 13 where a peak voltage greater than two times the DC input voltage line is developed. The peak voltage developed across resonant capacitor 13 is thus determined by the sum of the energy packet absorbed in resonant inductor 12 instead of simply becoming twice the input DC line voltage as would be the normal case. Voltage across the resonant capacitor 13 continues to rise with each additional quantum of energy deposited across it by successive transfer of energy from resonant inductor 12, until the output reaches its prescribed voltage level. The control loop then clamps the peak voltage developed across the resonant capacitor 13 and the circuit enters its regulation band with no further voltage increase in resonant capacitor 13. Further increase in input line DC voltage is curtailed within the regulated AC power supply embedded within the over-all DC-DC conversion process. Via progression of the timing pulse along the cosine slope of the negative cycle towards the 0 (zero) voltage reference in the AC signal developed across the anti-resonant tank circuit. Therefore the volt-second product absorbed by the resonant inductor 12, from the negative cycle in the AC power signal across the anti-resonant is equal and opposite from the volt-second product absorbed from the input DC line. Hence, voltage delivered from the DC current source to resonant capacitor 13 remains constant. Via the error signal generated by the PPD feedback control loop which directs the degree of timing signal migration along the cosine slope of the negative cycle in the AC power signal generated in the anti-resonant tank circuit.

Primary winding current in power transformer 14 is delivered to the load via alternate transmission through each half of the secondary winding. The secondary voltage signal Vs is directed to smoothing inductor 17 which is used to absorb the AC component in voltage Vs. The resulting pulsating AC current Is component is circulated through filter capacitor 18 with the resultant DC component being directed to the load. The full wave circuit configuration of FIG. 2 is the most power efficient by virtue of both the positive as well as negative current components in the AC waveform impressed across power transformer 14 are delivered to the load. This being the case; peak current demand from the DC current source is less by virtue of the power signal being transported through the magnetic interface throughout the entire AC cycle.

FIG. 3: Illustrates a non-polarized, half-wave rectifier, simulated fly-back circuit configuration. The primary power loop extending from Vin DC to primary voltage on transformer 20 input winding Vp is essentially identical in the transmission and management of power as that described for FIG. 2 above, with minor considerations enumerated as follows:

1. Power conversion efficiency is not as high as in FIG. 2 due to power transmission being confined to only half of the AC power cycle.
2. Resonant capacitor 19 becomes about 20% larger for this application than is required for the circuit of FIG. 2.
3. Transformer 20 winding RMS current is larger, due to higher peak current circulation, in this configuration than it is for the circuit of FIG. 2.
4. Output Filter capacitor in the load; either must have a very low esr, or be shunted by a low esr, capacitor of moderate capacity.
5. Output voltage Vs requires a peak voltage amplitude of 14V to satisfy the power transfer requirement.
6. Output current Is requires a peak current amplitude of 5.7A to satisfy the power transfer requirement.

FIG. 4: Illustrates a non-polarized, half-wave rectifier, with a wave-shaping filter inductor inserted into the output filtering assembly. The primary power loop extending from Vin DC to the primary voltage on transformer 23 input winding Vp is essentially identical in the transmission and management of power as that described for FIG. 2 above, with minor considerations enumerated as follows:

1. Power conversion efficiency is not as high as in FIG. 2 due to power transmission being confined to only half of the AC power cycle.
2. Resonant capacitor 22 becomes slightly larger, 10–12%, for this application than is required for the circuit of FIG. 2.
3. Transformer 23 winding RMS current is larger, due to higher peak current circulation, in this configuration than it is for the circuit of FIG. 2.
4. Output filter capacitor in the load must be larger than that specified for FIG. 2 due to longer hold-up time between charging pulses.
5. Output voltage Vs requires a peak voltage amplitude of 9V to satisfy the power transfer requirement.
6. Output current Is requires a peak current amplitude of 3.1 A to satisfy the power transfer requirement.

FIGS. 3 and 4 were constructed and tested to demonstrate the flexibility of CSAR technology with respect to being incorporated within diverse circuit topologies. The circuit of FIG. 2 incorporates certain features embodied in either FIGS. 3 and/or 4 and blends them into a discrete and independent functional circuit topology. There are, however, certain power transfer applications where application of either power transfer function described in FIGS. 3 and/or 4 may prove to be most appropriate. The topology in FIG. 3 may prove to be desirable in high voltage applications due to the requirement for only one rectifier and the relatively low voltage generated by the transformer output winding Vs. The circuit of FIG. 4 may find suitable application in low voltage, low power usage due to the low volumetric efficiency associated with low power designs.

Figure 5:
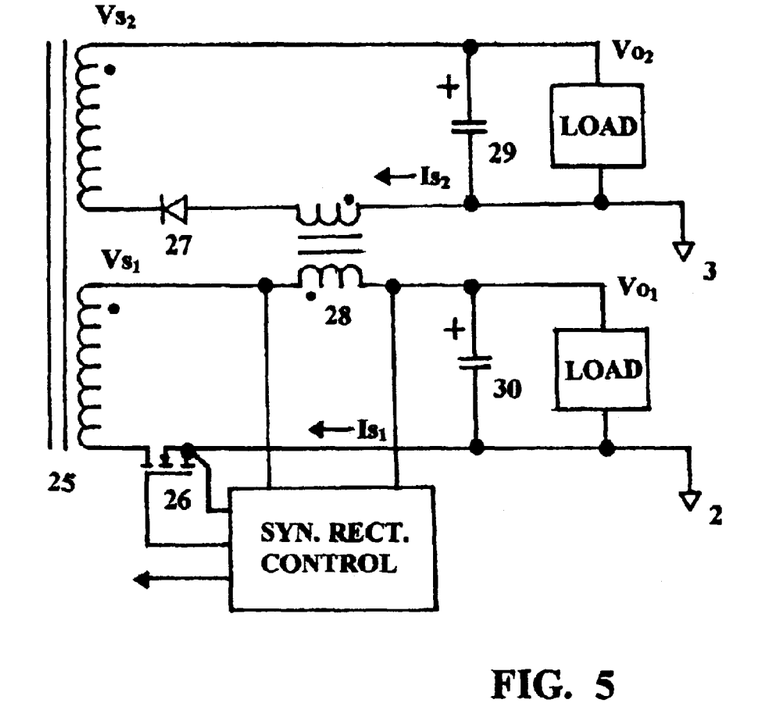
FIG. 5 illustrates one possible deployment incorporating multiple outputs generated by a single power transformer.

FIG. 5: Illustrates integration of multiple output windings on a common core as shown for power transformer 25. Multiple outputs become feasible due to all load currents being impress upon a single primary winding where the actual power management process takes place. Windings outside the control loop become quasi-regulated which is a standard design procedure for outputs tolerant of moderate voltage fluctuations on their respective outputs. Active rectification is shown for $VS_1$ because it is assumed to be the low voltage winding. Whereas; static rectification is shown for $VS_2$ because it is assumed to be a higher voltage serving some auxiliary requirement. In this circuit; as $VS_1$ swings positive with respect to a voltage of equal polarity developed across the primary winding of transformer 25. Voltage across output filter inductor 28 is monitored by the synchronous rectification control circuit. When output voltage $VS_1$ becomes equal to the DC voltage level of $Vo_1$ the synchronous rectification control circuit generates a timing signal to turn-ON power switch 26 on a 50% duty cycle. The circuit thus controls time of conduction on an active basis by means of artificial rectification. Auxiliary voltage $VS_2$ being of similar polarity also conducts when the voltage generated by the winding exceeds the output voltage $Vo_2$ by the forward voltage drop of rectifier 27. The two winding share a common filtering inductor 28 as a means of inducing tighter coupling between the two outputs.

Figure 6:
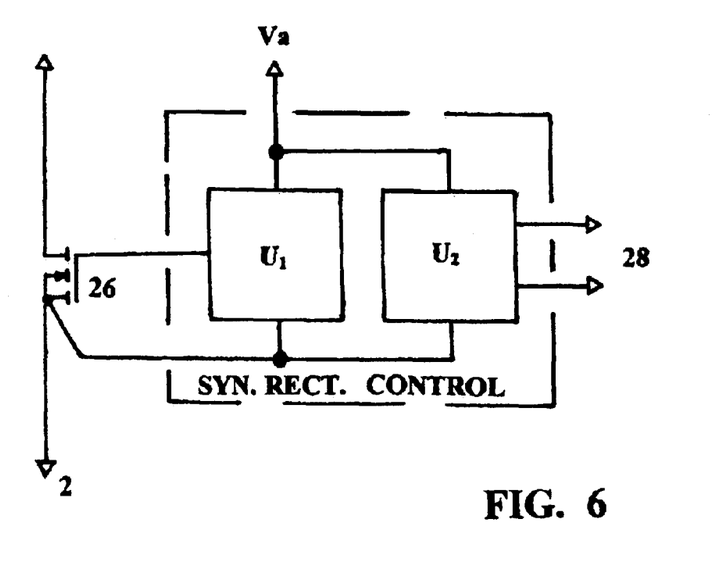
FIG. 6 shows a detailed internal structure for one possible implementation of synchronized rectification control circuitry.

FIG. 6: This figure reveals the internal functional circuits employed in a representative synchronous rectification control circuit. $U_1$ denotes a high-current Power-FET driver, coupled to power switch 26, while $U_2$ represents a zero-crossing voltage detecting circuit used to sense voltage across filter inductor 28. Va denotes an auxiliary voltage source providing power to the control circuit.

FIG. 7: describes a continuous plot for ascertaining pertinent relationships relative to design coefficient (K) with respect to the Fn/Fo ratio bounded within the carrier-frequency envelope. The important object derived from this plot is in visualizing the need for a low design coefficient, this is why the chart cuts-off at a design K of 1.25. This is due to a need for generating a large negative voltage component in the anti-resonant tank AC voltage. A large negative signal yields a long cosine slope from which to generate the volt-second envelope by the intercepting action of the timing pulse leading edge.

FIG. 7A: Illustrates the load component Ro reflected from the output terminals into the anti-resonant tank circuit, and coupled to the open-circuit inductance Lp of the primary winding on the power isolation transformer during time of the Fo component of the carrier-frequency. The resulting impedance then appears across the resonant capacitor Cr to form a loading characteristic on capacitor Cr. This impedance then loads the resonant capacitor Cr in such a manner as to introduce a Z-C time constant, dictating—to some extent—the discharge rate of the resonant capacitor consistent with eq. 2.

FIG. 7B: Denotes tank loading impedance during time of the Fn component of the carrier-frequency. Voltage polarity of the transformer winding inductance Lp reverses at this time, forcing a reversal of current through the resonant capacitor Cr and reflected load component Ro. Anti-resonant tank internal impedance is approximated as a first-order function by eq. 5.

Figure 8:
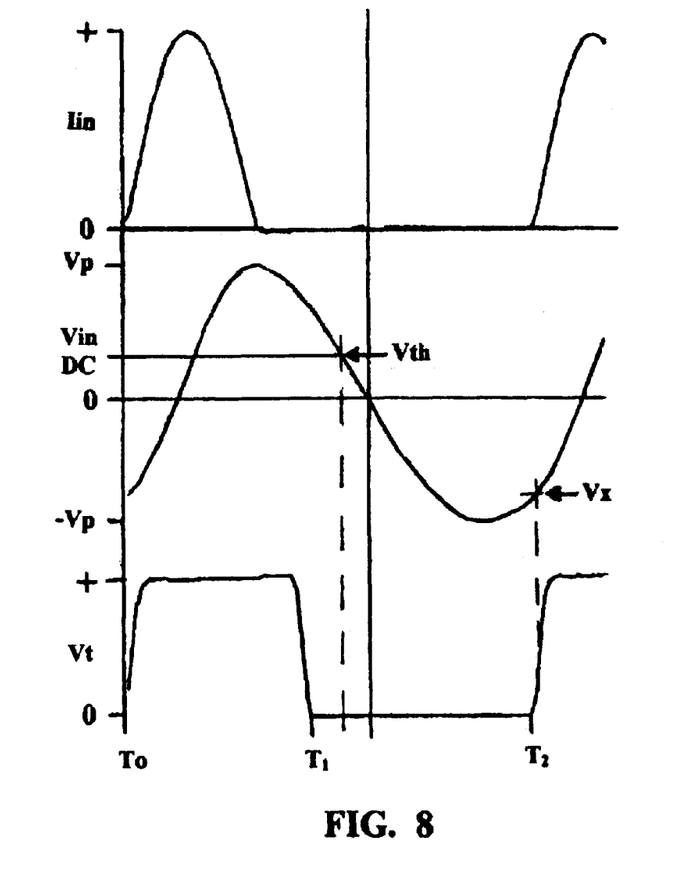
FIG. 8 denotes time/amplitude relationship between timing pulse, Vt, transformer primary voltage, Vp, and input current, Iin, with an input voltage of 20V DC at full load for the circuit of FIG. 2. Plot emphasizes −Vp intercept point Vx by tiling pulse, Vt leading-edge, and Vp intercept point Vth by timing pulse Vt, trailing-edge. It shows the difference between frequency of series-resonant input tank circuit Iin, and timing pulse frequency plotted in the time domain.

FIG. 8: Plots the following parameters for input DC line voltage of 20V. Oscilloscope traces are provided for DC current source input current, Iin, anti-resonant tank AC voltage, Vp, –Vp impressed on the primary winding of power transformer 14. Power switch 10 timing pulse, Vt, applied by the PPD control circuit at a specified input DC line voltage. And the input DC line voltage, Vin DC. Application of the timing pulse by the PPD control circuit results in the turn ON of power switch 10 by the leading edge transition of the timing pulse. Activation of power switch 10 allows current Iin to flow as a half-sine pulse into the anti-resonant tank circuit to maintain continuous oscillation in the AC source driving the regulated AC power supply embedded in the over-all DC-DC power transfer function. Input current Iin encloses a frequency component whose time base is considerably less than that for the timing-pulse, Vt. The timing pulse leading edge intercepts the negative, –Vp, portion of the AC sine wave as it decreases toward the 0 (zero) voltage reference of the AC signal. Timing pulse Vt trailing edge occurs at some point in time prior to the positive portion of the AC sine wave Vp having decayed below the super-imposed level of the input DC line voltage Vth upon the decaying sine wave.

Figure 9:
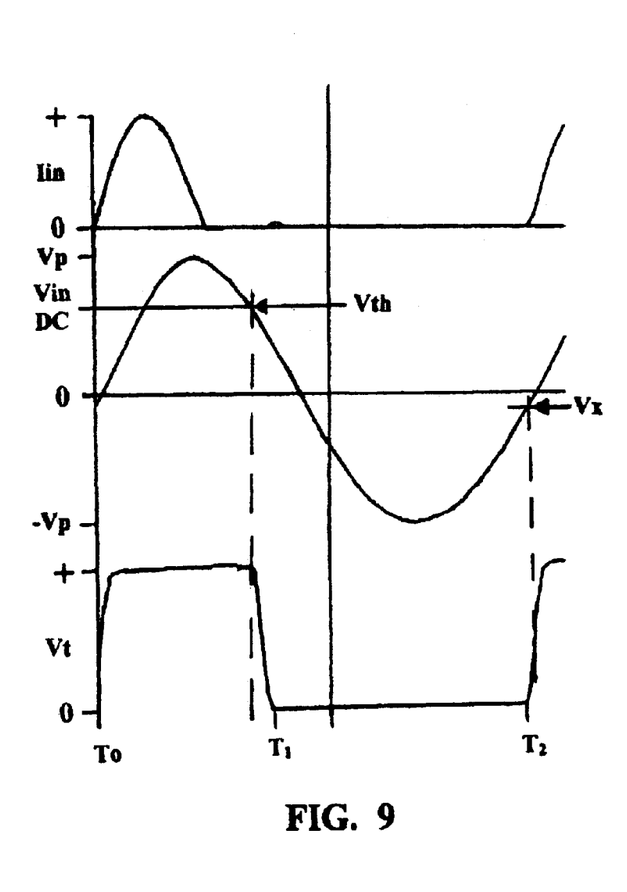
FIG. 9 denotes time/amplitude relationship between timing pulse, Vt, transformer primary voltage, Vp, and input current, Iin, with an input voltage of 40V DC and full load for the circuit of FIG. 2. Plot emphasizes −Vp intercept point, Vx, by tiling pulse, Vt leading-edge, and Vp intercept point Vth by timing pulse Vt trailing-edge. It shows the difference between frequency of series-resonant input tank circuit Iin, and timing pulse frequency plotted in the time-domain.

FIG. 9: Plots the following parameters for input DC line voltage of 40V. Oscilloscope traces are provided for DC current source input current, Iin, anti-resonant tank AC voltage, Vp, –Vp impressed on the primary winding of power transformer 14. Power switch 10 timing pulse, Vt, applied by the PPD control circuit at a specified input DC line voltage. And the input DC line voltage, Vin DC. Application of the timing pulse by the PPD control circuit results in the turn ON of power switch 10 by the leading edge transition of the timing pulse. Activation of power switch 10 allows current Iin to flow as a half-sine pulse into the anti-resonant tank circuit to maintain continuous oscillation in the AC source driving the regulated AC power supply embedded in the over-all DC-DC power transfer function. Input current Iin encloses a frequency component whose time base is considerably less than that for the timing pulse, Vt. The timing pulse leading edge intercepts the negative, –VP, portion of the AC sine wave as it decreases toward the 0 (zero) voltage reference of the AC signal. Timing pulse Vt trailing edge occurs at some point in time prior to the positive portion of the AC sine wave Vp having decayed below the super-imposed level of the input DC line voltage Vth upon the decaying sine wave. As a point of contrast: Please note the off-sets between intercept point Vx, upon the negative portion of the AC sine wave for the two specified input line voltages. And the super-imposed input DC line voltage upon the positive portion of the AC power waveform Vth for the two specified input line voltages. Also notice the peak amplitude variation for input current Iin developed by the two input DC line voltages. The peak amplitude for fin at 40V DC is exactly half that for an input of 20V, by actual measurement.

MATERIALS USED IN REDUCTION-TO-PRACTICE MODELS

A) P-C board: single-sided, universal I-C layout, 1 oz. Cu.
B) Magnetic cores: Toroidal MPP.

C) Cu. Wire: Single solderable film. Single-strand or simulated Litz, as req'd.
D) Resonating capacitors: Ceramic, NPO
E) Filter capacitors: X7R ceramic, dry AL. Electrolytic.
F) Power switch: Power-FET/p-n junction series combination.
G) Rectifying elements: Schottky diodes.
H) Control circuit: Commercial I-C's.

What is claimed is:

1. A resonant power with regulated AC primary-side resonance and zero-current switching adapted to convert power from an input DC voltage source to a DC terminal output load comprising:

an input current stage configured to receive a power from a DC input power source;

a regulated sinusoidal AC full-wave power source configured to receive power from said input current source;

a power transformer configured to provide DC isolation between said regulated sinusoidal AC full-wave power source and said DC terminal output load;

an output power stage configured to impose an output DC signal on said DC terminal output load by receiving power from said power transformer;

wherein said input current stage includes a zero-current switch topology comprising a resonant capacitor, a resonant inductor and a unidirectional conducting device with a switching element arranged in series with said zero-current switch;

a feedback control circuit arranged as a pulse-position-demodulator (PPD) configured to impose a volt-second product exchange between said input current stage and said regulated sinusoidal AC full-wave power source.

2. The power converter of claim 1 wherein said power transformer further comprises: an input winding and a non-polarized output winding wherein said input winding is connected said input current stage and said output winding is connected to said output stage.

3. The resonant power converter of claim 2 wherein said power transformer input winding as connected in parallel with said resonant capacitor in a regulated AC full-wave configuration.

4. The resonant power converter of claim 2 wherein said output stage further comprises: A filter inductor, a filter capacitor connected to said filter inductor, rectifying elements connected to said filter capacitor and a center-tapped output winding on said power transformer whose winding ends connect to said rectifying elements and center-tap connects to said filter inductor.

5. The resonant power converter of claim 4 wherein said output stage filtering elements may be implemented in any combination of half or full-wave rectifier/filter configuration.

6. The resonant power converter of claim 1 wherein said PPD control mode is configured to open said zero-current switching element at some predetermined time after cessation of current in said zero-current switch.

7. The resonant power converter of claim 1 wherein said PPD control mode is configured to open said zero-current switching element at some predetermined time prior to the AC positive sinusoid falling below the projected voltage level of said DC input power source.

8. The resonant power converter of claim 1 wherein said PPD control signal intersects the AC voltage negative sinusoid in the anti-resonant tank and reflects its volt-second product into said input current stage where it combines with the volt-second product normally absorbed by said resonant inductor from said input DC voltage source whereby sum of volt-second product absorbed by said resonant inductor is transferred to said resonant capacitor.

9. The resonant power converter of claim 1 wherein said PPD control mode intersect point along said AC negative sinusoid varies in an inverse manner from voltage variations applied to said input current stage by said input DC voltage source.

10. The resonant power converter of claim 3 further comprising:

a power transfer function wherein said resonant capacitor offers a full-wave regulated voltage source to said input winding of said power transformer in isolation from said switching element situated within said zero-current switch.

11. The resonant power converter of claim 8 wherein said PPD feedback control loop monitors said output voltage across said load, upon sensing an out-of-limit condition alters voltage intercept paint in said AC negative sinusoid to restore said output signal within prescribed limits.

12. The resonant power converter of claim 6 wherein said PPD control mode is configured to open said zero-current switch at a time coincident with current cessation in said zero-current switch.

* * * * *